US011558651B2

(12) United States Patent
Carroll et al.

(10) Patent No.: US 11,558,651 B2
(45) Date of Patent: *Jan. 17, 2023

(54) METHOD AND APPARATUS FOR FLEXIBLE CONSUMPTION OF MEDIA CONTENT

(71) Applicant: AT&T Intellectual Property I, L.P., Atlanta, GA (US)

(72) Inventors: Benjamin Carroll, Atlanta, GA (US); Sourjo Basu, Norcross, GA (US); Samir Idnani, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,478

(22) Filed: Sep. 30, 2021

(65) Prior Publication Data

US 2022/0030292 A1  Jan. 27, 2022

Related U.S. Application Data

(63) Continuation of application No. 16/502,354, filed on Jul. 3, 2019, now Pat. No. 11,166,062, which is a (Continued)

(51) Int. Cl.
*H04N 21/41* (2011.01)
*H04N 21/262* (2011.01)
(Continued)

(52) U.S. Cl.
CPC . *H04N 21/41265* (2020.08); *H04N 21/25875* (2013.01); *H04N 21/25891* (2013.01); (Continued)

(58) Field of Classification Search
CPC ......... H04N 21/4126; H04N 21/25875; H04N 21/25891; H04N 21/26258; (Continued)

(56) References Cited

U.S. PATENT DOCUMENTS 6,486,920 B2  11/2002  Arai
6,571,279 B1  5/2003  Herz et al.
(Continued)

FOREIGN PATENT DOCUMENTS

EP     2288108 A1    2/2011
EP     2788946 A1   10/2014
WO  2014089345 A1    6/2014

OTHER PUBLICATIONS

"Press: Cognitive Networks to Demonstrate Next-Generation Television Viewing Experiences at CES", cognitivenetworks.com, Dec. 29, 2014.
(Continued)

*Primary Examiner* — Randy A Flynn
(74) *Attorney, Agent, or Firm* — Guntin & Gust, PLC; Matthew Tropper

(57) ABSTRACT

Aspects of the subject disclosure may include, for example, a method including presenting a playlist of media content generated by a predictive model of preferences of a user of a system based on first prior media consumption associated with a subscription television service and second prior media consumption associated with an internet-based service, receiving a first selection of first media content from the playlist, presenting a menu of viewing devices for viewing the first media content, receiving a second selection of a first companion device for the first media content from the menu of viewing devices, transmitting the first selection and the second selection to a content provider, receiving the first media content from the content provider, and presenting the first media content. The content provider can transmit, to the first companion device, supplementary content, including internet-based content associated with the first media content, for presentation at a display.

20 Claims, 12 Drawing Sheets

Related U.S. Application Data continuation of application No. 14/921,436, filed on Oct. 23, 2015, now Pat. No. 10,397,631.

(51) Int. Cl.

| | | |
|---|---|---|
| *H04N 21/258* | (2011.01) | |
| *H04N 21/482* | (2011.01) | |
| *H04N 21/81* | (2011.01) | |
| *H04N 21/2668* | (2011.01) | |
| *H04N 21/2665* | (2011.01) | |
| *H04N 21/435* | (2011.01) | |
| *H04N 21/472* | (2011.01) | |
| *H04N 21/4722* | (2011.01) | |

(52) U.S. Cl.
CPC ..... *H04N 21/2665* (2013.01); *H04N 21/2668* (2013.01); *H04N 21/26258* (2013.01); *H04N 21/435* (2013.01); *H04N 21/4722* (2013.01); *H04N 21/47202* (2013.01); *H04N 21/4825* (2013.01); *H04N 21/8133* (2013.01)

(58) Field of Classification Search
CPC ........... H04N 21/2665; H04N 21/2668; H04N 21/435; H04N 21/47202; H04N 21/4722; H04N 21/4825; H04N 21/8133
See application file for complete search history.

(56) References Cited

U.S. PATENT DOCUMENTS

| | | | |
|---|---|---|---|
| 6,772,147 | B2 | 8/2004 | Wang et al. |
| 6,774,926 | B1 | 8/2004 | Ellis |
| 8,239,893 | B2 | 8/2012 | McClanahan et al. |
| 8,280,982 | B2 | 10/2012 | La et al. |
| 8,490,135 | B2 | 7/2013 | Patten et al. |
| 8,621,546 | B2 | 12/2013 | Davidson et al. |
| 8,751,672 | B2 | 6/2014 | Ruiz-Velasco et al. |
| 8,918,825 | B2 | 12/2014 | Mukerji |
| 8,935,726 | B2 | 1/2015 | Young et al. |
| 8,990,855 | B1 | 3/2015 | Calzone |
| 9,049,073 | B2 | 6/2015 | Klappert et al. |
| 9,083,916 | B2 | 7/2015 | Castellan et al. |
| 9,094,704 | B2 | 7/2015 | Mukerji |
| 9,143,735 | B2 | 9/2015 | Angiolillo et al. |
| 2002/0144267 | A1 | 10/2002 | Gutta et al. |
| 2003/0121047 | A1* | 6/2003 | Watson ............ H04N 21/47202 725/98 |
| 2006/0123455 | A1 | 6/2006 | Pai et al. |
| 2006/0189319 | A1 | 8/2006 | Houldsworth et al. |
| 2008/0046099 | A1 | 2/2008 | Belmont et al. |
| 2008/0120683 | A1 | 5/2008 | Frazier et al. |
| 2009/0150553 | A1 | 6/2009 | Collart et al. |
| 2009/0199254 | A1 | 8/2009 | White et al. |
| 2010/0153985 | A1 | 6/2010 | Dey et al. |
| 2011/0002399 | A1 | 1/2011 | Raveendran et al. |
| 2011/0066745 | A1 | 3/2011 | Olsson et al. |
| 2011/0110309 | A1 | 5/2011 | Bennett |
| 2011/0131520 | A1 | 6/2011 | Al-Shaykh et al. |
| 2011/0145869 | A1* | 6/2011 | Rahman ............ H04N 21/6332 725/87 |
| 2011/0188439 | A1 | 8/2011 | Mao et al. |
| 2011/0246566 | A1 | 10/2011 | Kashef et al. |
| 2012/0159531 | A1 | 6/2012 | O'Callaghan et al. |
| 2012/0210346 | A1 | 8/2012 | McCoy et al. |
| 2013/0170813 | A1 | 7/2013 | Woods et al. |
| 2013/0174035 | A1 | 7/2013 | Grab et al. |
| 2013/0263186 | A1 | 10/2013 | McCoy et al. |
| 2014/0082212 | A1 | 3/2014 | Garg et al. |
| 2014/0189513 | A1 | 7/2014 | Dua |
| 2014/0195675 | A1 | 7/2014 | Silver et al. |
| 2014/0337335 | A1 | 11/2014 | Gordon et al. |
| 2015/0058572 | A1 | 2/2015 | Earle |
| 2015/0169705 | A1 | 6/2015 | Korbecki et al. |
| 2015/0319499 | A1 | 11/2015 | Olague et al. |
| 2017/0118500 | A1 | 4/2017 | Carroll |
| 2019/0327511 | A1 | 10/2019 | Carroll et al. |

OTHER PUBLICATIONS

Abell, John C., "Google Unveils Personalized Channels' to Bridge TV Attention Gap", wired.com, Dec. 1, 2010, 3 pages.

Kasperkevic, Jana, "Netflix: In the Future, Everyone Will Have a Personalized TV Channel", Business Insider, Jun. 1, 2014.

Yiannopoulos, Milo, "Get your own personal TV channel with Stupeflix.TV", Tech Crunch, Sep. 21, 2009.

* cited by examiner

100

300

400

500

600

800

900

METHOD AND APPARATUS FOR FLEXIBLE CONSUMPTION OF MEDIA CONTENT

CROSS-REFERENCE TO RELATED APPLICATIONS

The present application is a continuation of U.S. patent application Ser. No. 16/502,354 filed Jul. 3, 2019, which is a continuation of U.S. patent application Ser. No. 14/921,436 filed Oct. 23, 2015 (now U.S. Pat. No. 10,397,631). All sections of the aforementioned application(s) and/or patent(s) are incorporated herein by reference in their entirety.

FIELD OF THE DISCLOSURE

The subject disclosure relates to a method and apparatus for flexible consumption of media content.

BACKGROUND

Media content is typically experienced by consumers via devices such as computers, televisions, radios, and mobile electronics. Media content can be delivered by service providers, who send the content, such as television, radio, and video programming, to consumers for enjoyment at their physical locations. Modern communications networks benefit from interconnectivity between consumers and various communication devices. As network capabilities expand, these interconnections can provide new opportunities to enhance the ability for consumers to enjoy media content by experiencing a variety of content over multiple devices. Intelligent devices offer means for the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
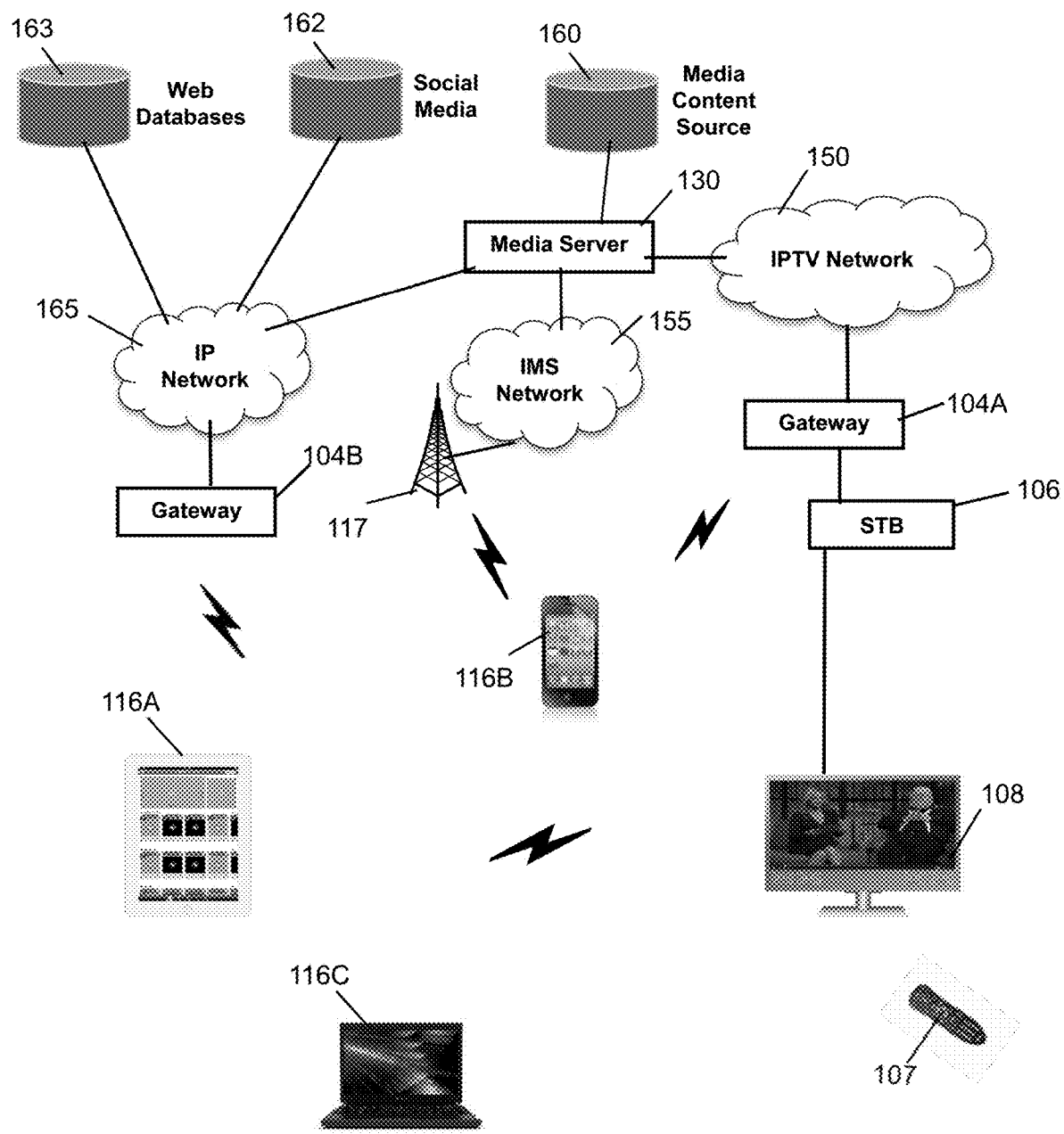
FIG. 1 depicts an illustrative embodiment of a system that can be utilized for providing flexible consumption of media content.

The subject disclosure describes, among other things, illustrative embodiments for providing flexible consumption of media content. An aggregation of media content can be provided to a device, such as a television or a mobile communication device. The aggregation can be in the form of a playlist of media content, where the items can be selected and the playlist can be ordered based on information about a user of the device, such as consumption history or user-supplied preferences. The playlist can include media content that requires a subscription and/or media content that is available without subscription. The device can automatically play through the media content items using an order that is preselected by the playlist, or it can respond to user selections of particular items. The playlist can allow the user to determine where the media content is consumed. The device can present the media content at its local display, or it can cause the media content to be presented at another device. If the presentation is handed off to another device, then the original device can act as a companion device, where it can present additional content and/or information that is relevant to the media content that is currently being consumed. Other embodiments are described in the subject disclosure.

One or more aspects of the subject disclosure includes a device that can include a memory to store executable instructions and a processor coupled to the memory. The processor, responsive to executing the executable instructions, can perform operations for receiving from a content providing network, a playlist of media content and, in turn, presenting the playlist at a display. The playlist of media content can be an aggregation of subscription-based media content and non-subscription-based media content and can be generated based on preferences of a user of the device, first prior media consumption that is associated with a subscription television service, and second prior media consumption that is associated with an internet-based service. The processor can also perform operations for receiving a first selection of first media content from the playlist and presenting, at the display, a menu of viewing devices for viewing the first media content responsive to the receiving of the first selection. The processor can further perform operations for receiving a second selection of a first viewing device for the first media content from the menu of the viewing devices and, in turn, transmitting the first selection and the second selection to the content providing network responsive to the receiving of the second selection. The content providing network can cause presentation of the first media content at the first viewing device. The processor can perform operations for receiving supplementary content from the content providing network responsive to the transmitting of the first selection and the second selection, and presenting the supplementary content at the display. The supplementary content can include internet-based content that is associated with the first media content.

One or more aspects of the subject disclosure include a machine-readable storage medium, including executable instructions that, when executed by a processor, can facilitate performance of operations, including transmitting a playlist of media content to a first device. The playlist of media content can be generated by a predictive model of preferences of a user of the device based on first prior media consumption that is associated with a subscription television service and second prior media consumption that is associated with an internet-based service. The operations can also include receiving, from the device, a first selection of first media content that is selected at the device from the playlist, and receiving a second selection of a viewing device that is selected at the device from a menu of devices that are authorized for presenting the first media content. The operations can further include transmitting the first media content to the viewing device responsive to the receiving of the first selection and the second selection and, in turn, transmitting supplementary content to the first device responsive to the receiving of the first selection and the second selection. The viewing device can present the first media content. The supplementary content can include internet-based content that is associated with the first media content and can be presented at the first device.

One or more aspects of the subject disclosure include a method, including presenting, by a system comprising a processor, a playlist of media content that is generated by a predictive model of preferences of a user of the system based on first prior media consumption that is associated with a subscription television service and second prior media consumption that is associated with an internet-based service. The method can also include receiving, by the system, a first selection of first media content from the playlist and presenting, by the system, a menu of viewing devices for viewing the first media content responsive to the receiving of the first selection. The method can further include receiving, by the system, a second selection of a first companion device for the first media content from the menu of viewing devices and, in turn, transmitting, by the system, the first selection and the second selection to a content provider responsive to the receiving of the second selection. The method can include receiving, by the system, the first media content from the content provider; and, in turn, presenting, by the system, the first media content. The content provider can transmit supplementary content to the first companion device. The supplementary content can include internet-based content that is associated with the first media content, and the first companion device can present the supplementary content at a display.

FIG. 1 depicts an illustrative embodiment of a system that can be utilized for providing flexible consumption of media content. In one embodiment, the system 100 can incorporate a subscription content service. For example, the subscription content service can be part of a cable, satellite, fiber optic, and/or DSL based media content delivery system. The media content can be any type of viewable content, such as broadcast television, cable or premium television, video on demand, or pay-per-per view television. The media content can be subscription-based, such as basic cable, premium cable, or movie channel content. The media content can be non-subscription-based, such as "free" Internet-based content of over-the-air television content. In one embodiment, the system 100 can include one or more media servers 130 that can receive media content from one or more media content sources 160. Media servers 130 can provide media content to one or more delivery networks 150, 155, and 165. For example, a media server 130 can deliver media content services via an internet protocol television (IPTV) network 150, an internet protocol multimedia subsystem network 155, and/or an internet protocol network.

In one embodiment, media content can be routed to the IPTV network 150, which, in turn can deliver media content to a gateway device 104*b*. In turn, the gateway device 104A can route media content to a media processor device 106, such as a set-top box. In another embodiment, the media server 130 can deliver media content by the IMS network 155 to a mobility network 117. The mobility network 117 can route media content to a mobile communication device 116B, such as a wireless smart phone, via a cellular, long term evolution (LTE), third generation (3G), and/or fourth generation (4G) wireless networks. In one embodiment, the mobile communication device 116B can route media content that is received over the mobility network 117 by, for example, a mobile hotspot Wi-Fi link between the mobile communication device 116B and a wireless communication device 116*a*, such as a pad device 116A. In another embodiment, the media server 130 can deliver media content over a public IP network 165. In turn, the IP network 165 can deliver media content through a gateway device 104B to wireless communication devices 116A and 116C, such as a pad device 116A and wireless laptop device 116C, and mobile communication device 116B. Devices 116A, 122, 124, and 125 that receive media content from the IP network 165 can, in turn, transmit the media content to the media device 108 via direct connection, such as a USB port, or via a wireless connection, such as Wi-Fi.

The system 100 can further include authentication functions to insure that media content is distributed only to verified subscribers of the system 100 (or media content sources accessed by the system 100) according to service plan levels of those subscribers. For example, the system 100 can verify that media processor device 106 is be properly identified and validated for receiving media content over the system 100. For example, an authentication server can be used to verify the subscription status of the media processor device 106. Device identifying information, such as MAC address, IP address, and/or SIM card information, can be transmitted to the authentication server. The authentication server can use this identifying information from the media processor device 106 to inquire at a subscriber database of service plan information for a subscriber who is associated with the device 106. The subscriber database can provide subscription status and service plan information to allow the authentication server to enable delivery of purchased media content to the media processor device 106. In one or more embodiments, the media content can be selected based on a number of techniques and criteria, such as based on user input, user preferences, user profiles, monitored user viewing history, and so forth.

In one embodiment, the gateway device 104A can function as an interface between the IPTV network 155 and the media processor device 106. In one embodiment, the gateway device 104 can provide internet working functions, such as protocol translation, impedance matching, data rate conversion, and/or fault isolation necessary for exchanging data between the IPTV network 150 and the home-based media processor device 106.

In one embodiment, a public IP network 165 of the system 100 can facilitate communications to Internet-based applications, websites, and databases, such as Social Media sites 162 and Web Databases 163, as shown. This connectivity can allow devices 116A-C and servers 130 in the system 100 to access and be accessed by the various Internet-based applications, websites, and/or databases.

In one or more embodiments, a user of the system 100 can access media content from the system in very flexible ways. In one embodiment, an aggregation of media content can be provided to any of the wireless communication devices 116A-C of the user via an application running at the device. For example, a pad device 116A can have an installed application for receiving an aggregation of media content in the form of a playlist. In one embodiment, the aggregation of media content can be provided to an application and/or a personal television channel at the media device 108 via the media processor device 106.

In one or more embodiments, the aggregation or playlist of media content can be generated by a media server 130. The playlist can include a single media content item or a group of items. The media content items can be selected by the media server 130 from any of media content source 160 available to the media server 130. The media content items can be video, audio, text, images, applications, or any combination media that can be electronically conveyed and reproduced. The media content can be items that are "free" for access, such as public domain materials or materials that have been made freely accessible or freely linkable over the Internet. For example, the media content can be in the form a freely accessible Internet-based websites or databases that can be aggregated and transmitted in a playlist via URL links. In another example, the media content can be videos, audio, text, or other media types that can be referenced by URL links. In another example, the media content can be in material that is only accessible to those, who are licensed to access it, such as subscribers to services, such as Internet-based media streaming services, cable and/or satellite television services.

In one or more embodiments, the media server 130 can access data that is collected on a user. For example, the media server 130 can access demographic information regarding matters such as a user's age, sex, location, income level, occupation, or the communication devices that the user uses to access the application or personal television channel. If the user is a subscriber to a media content service, then the media server 130 can access subscription information to determine plan particulars, which content is available, which content is locked, which content can be made available for an additional fee, and so forth. If the user is a subscriber to one or more services with a service provider, then the media server 130 can have access to a great deal of information about the user. For example, if the user is a subscriber to a cable or satellite television service, then information is available regarding the user's demographics and the user's viewing history and preferences. The media server 130 can access information cataloging the programming that the user consumes via the media processor 106 and the media device 108, including programs watched, recorded, selected for on-demand viewing, purchased, and so forth. In another example, the user can be a subscriber to a telecommunications service provider, such as a cellular phone service for a mobile communication device 116B. In this case, the user of the mobile communication device 116B may consume media content from the media server over a 3G or 4G data connection. In another example, the user can be a subscriber to an Internet service provider. In this case, the user may consume content from the media server 130 via the IP network 165 via wireless connectivity to a gateway device 104B.

In one or more embodiments, the media server 130 can provide media content to any or several different types of devices 116A-C and 108, using any or several different networks 150, 155, and 165. In the most comprehensive case, the user can be a subscriber for a combination of services, such as Internet service, telecommunications service, and television service. In such a case, one or more media servers 130 can provide media content to a streaming application at any or several of the user's mobile communication devices 116A and B, computing devices 116C, and media devices 108. In the least comprehensive case, the user can be a person, who does not subscribe to any communications services of the company that operates the media server 130. For example, the user can obtain Internet services, telecommunications services, and/or television services from three different companies, where none of these are affiliated with the company of the media server 130 or where one is affiliated, while the others are not. In another example, the user can be a subscriber only to a telecommunications service or only an Internet service but have no subscription for television services. In each case, the media server 130 can still provide access to media content to one or more of the user's devices 116A-C and 108 via the streaming application, where the communications pathway and the types of media content that can be provided by the media server 130 will depend on the user's relationship to media server 130.

If the user is "full service" customer, who subscribes to Internet, wireless telecommunication, and television services from the company that operates the media server 130, then the media server 130 can provide media content any of the user's devices via a streaming application at those devices using one or more of the available services. For example, a media device 108, such as a television, of the "full service" customer can receive subscription-based media content from the media server 130 via the IPTV network and the media processor (STB) 106. In this case a playlist of aggregated media content can be delivered on a personal television channel that is received and processed at the media processor device 106 with the user directing the process using a remote control device 107. The same media device 108 can also receive a playlist from the media server 130 via the IP network 165 and gateway device 104B, if the media device 108 supports wireless IP communication. In this case, the playlist of media content can be provided to the media device 108 via a streaming application executing at the media device 108 in a fashion similar to how a pad device 116A would receive the playlist. In another example, a mobile communication device 116B of the user can receive the playlist of aggregated media content via the IMS network 155 and a wireless base station 117 that supports high speed data. As with the media device 108, the mobile communication device 116B could also receive the playlist via the IP network 165.

In one or more embodiments, the level of service, whether the user is a "full service" subscriber, a "particular" service subscriber, or a "no" service subscriber, can determine the possible communications pathways for delivering the playlist of aggregated media content and the breadth and depth of user information available to the media server 130 for formulating the playlist. In the "full service" case, the media server 130 can provide the playlist to multiple devices 116A-C and 208 via multiple pathways and can access demographic and content consumption information that is associated with any and all of the services. For example, the media server 130 can know the television viewing history, the Internet access history, and the cellular data access history for the "full service" user and can use this full range of information to formulate a personalized playlist for the user that takes all of these usage options into account. If the user is a "particular" service or "no" service subscriber for the company operating the media server 130, then the demographic and historical information for this user may be limited to only the information that is related to streaming application. For example, if the user's only connection to the media server 130 is via the streaming application that is downloaded onto the user's pad device 116A via an Internet service that is paid for by a third party (e.g., a college student accessing wireless service in her dorm room via the college Internet service), then the media server 130 can still formulate a playlist for the user, but the information may be limited to user-provided demographics and preferences provided when the user downloaded and activated the application, the user's subsequent history of using the application, and any information that media server 130 can glean from Internet sources.

In one or more embodiments, the media server 130 can formulate and deliver a playlist of aggregated media content to one or more of user devices 116A-C and 108, via one or more communication paths in the system 100. The playlist can include one or more types of media content, including video, audio, text, multimedia, links to web-based content, and so forth. In one embodiment, the playlist can be formulated to provide media content that has a high likelihood of being consumed by the user. In the ideal case, the media server 130 is able to user the available information on the user's demographics, past media consumptions, social media interaction, and so forth, to generate a playlist of media content that is so well-selected and ordered that the user is glad to consume the media content, starting at the first item in the playlist and ending only when the user decides to break from consumption (e.g., to sleep). The goal is to use rich information about the user to generate a playlist of the most appropriate media content for the user.

In one or more embodiments, the media server 130 can aggregate subscription-based content and non-subscription-based content according the various subscriptions of the user. For example, the user can subscribed to a particular set of media services as part of a paid cable or satellite television service plan. The same user can subscribe to a free website featuring streaming content and a free social network site. The media server 130 can aggregate content from all of these subscribed sources, including the television subscription, where the media server 130 possesses the access rights to the content. The user can share access information for subscription services with the media server 130 to allow the media server 130 to access and aggregate content from these sources. In one embodiment, the playlist can be generate a sequence of media content transitioning from subscription services, such as movie broadcast by a cable television channel, to non-subscription services, such as a video from an Internet site, to free subscription services, such as a news article from an advertiser-based, subscription news service. In one or more embodiments, the media server 130 can aggregate content from all the various media services to which the user has access rights. Rather than confining the user's access to a paid subscription premium channel at this television 108, this service is now made available to any device 116B of the user and is effectively presorted and prioritized for the user to be made aware of the content and to consume it wherever and whenever the user chooses.

In one or more embodiments, the media server 130 can authenticate a user before sharing the user's latest playlist the streaming application at that device 116A. The application can request an authenticating username and password or other identifying information from the user and pass this information to the media server 130 for authentication. In one or more embodiments, the media server 130 can verify the subscription rights of the device 116A for presenting particular media content. In one embodiment, the media server 130 can formulate the playlist such that the playlist will only include media content that can be viewed at any device of the user. For example, the user can have subscription rights to a particular media content item that is accessible only through the user's mobile communication device 116B. The media server 130 can use this information to exclude any media content aggregation from this source so that the playlist will not be incompatible with other devices of the user, such as the user's television 108. In another embodiment, the media server 130 can generate multiple playlist versions, where each version includes content aggregated from all of the sources for which that device is duly subscribed. Returning to the prior example, the user's mobile communication device 116B can receive a different playlist that the user's television 108 to account for the differing and incompatible subscription rights.

In one or more embodiments, when a user device 116A receives a playlist of aggregated content from the media server 130, then the playlist application can be configured to automatically play through the playlist or to wait for user input. In automatic play mode, the application will play through the playlist, item by item in order, from beginning until end. In manual mode, the application will play each item that is selected by the user and then wait for further inputs by the user. The user can select items, play, pause, replay, skip, parse, fast forward, and/or rewind.

In one or more embodiments, the application allows the user to select which device will present a media content item from the playlist. For example, a pad device 116A of the user can receive a playlist of aggregated content from the media sever 130 and present this playlist to the user via the display of the pad device 116A. The user can then select a particular media content item from the playlist. The user can then be given the opportunity to select where the selected media content item will be presented. In one embodiment, the user is presented with a pull-down menu that lists all of the user's devices which can be used to present the selected content. In one embodiment, the media server 130 can preload the menu with devices that it has determined are capable of presenting the content. The media server 130 can determine which devices have subscriptions rights to the content (if applicable), which devices are capable of supporting reproduction of the selected content, and/or which devices have communication paths that are capable of supporting, for example, streaming media content. In one example, a user can access a playlist via a streaming application operating at a pad device 116A. The playlist can include a movie, which has subscription rights based in a satellite television service to which the user has subscribed and which extends to selected additional mobile devices of the user. The movie requires a particular video decoder at the reproducing device and a minimum bandwidth for the streaming data path. During the process of generating the playlist, the media server 130 can determine that the television device 108, the pad device 116A, and the laptop computer 116C of the user meet all the requirements for presentation of the streaming movie. However, the mobile communication device 116B fails one of the requirements (e.g., the subscription rights do not extend to cellular devices). In this case, the media server 130 can preload the pull-down menu in the playlist such that it will only provide options for selecting the television device 108, the pad device 116A, or the laptop computer 116C, while excluding the option of the mobile communication device 116B. In one embodiment, the process of determining the available options for presenting the media content can be performed in real-time, so that the menu is updated based on the most current information. In one embodiment, the user can select the presentation device before selecting the particular media content item that the user wishes to experience. In this case, the application can filter the playlist so that only those media content items that can be presented at the choose device are made available for selection by the user.

In one or more embodiments, the user can cause the selected media content (or all or part of the entire playlist) to be presented at another device. For example, the can open the application at the pad device 116A but select the laptop computer device 116C for presentation of a particular item. In this case, the streaming application can be automatically and remotely started at the laptop computer device 116C or the user can manually start the application at the laptop computer device 116C. In one embodiment, the laptop computer device 116C can be remotely controlled by the pad device 116A. For example, the pad device 116A can connect to the laptop computer device 116C via a short range communication link, such as BlueTooth™, and command the laptop computer device 116C to start the application and/or to receive the playlist and/or to receive and present a data stream of the selected media content. In another example, the pad device 116A and the laptop computer device 116C can communication via a local area network (LAN), which can be supported by the gateway device 104B and/or a local router that is supporting WiFi communications at the location. In another example, the pad device 116A and the laptop computer device 116C can communicate, indirectly, via the media server 130, where each device is operating via independent access to the IP Network. In one or more embodiments, the data path for the streaming media content can exhibit similar levels of flexibility. For example, the application can be configured such that the selected media content item is streamed to the pad device 116A and then forwarded to the laptop computer device 116C, either as a stream or as a data file, for presentation of a the laptop computer device 116C. The media content data can be transmitted from the pad device 116A to the laptop computer device 116C via the short range link or via a LAN. In another example, when the pad device 116A selects the laptop computer device 116C for presentation of the media content, then the media serve 130 begins communicating directly with the laptop computer device 116C for control of the application and for streaming the selected media content directly to the laptop computer device 116C via the IP Network 165. In one or more embodiments, each selection of and/or transfer of presentation of media content and/or playlists between user devices can, similarly, utilize any of the available communication links in the system 100. For example, the user could receive a playlist at the television device 108 but select to have a media content item presented at the user's mobile communication device 116B. Depending on the present location of the mobile communication device 116B, it can be advantageous to perform transfers and/or streaming of content via the IMS network 155 and local wireless base station 117, a first local LAN supported by the television gateway 104A to the private IPTV Network 150, a second local LAN supported by the IP gateway 104B to the public IP Network 165, a short range link to the media processor device (STB) 106, or some combination of these pathways. The system 100 provides flexibility for the application at the each device and the media server 130 to select the communication paths based on many factors, including reliability, availability, bandwidth, and so forth.

In one or more embodiments, when a first device transfers the presentation of media content to a second device, then the first device can enter a companion mode. Returning to the prior example, when the pad device 116A transfers the presentation of the playlist to the laptop computer device 116C, the pad device 116A can then enter a companion mode. In companion mode, the pad device 116A can present supplementary content that is correlated to the playlist that is being presented at the laptop computer device 116C. For example, if the application at the laptop computer device 116C is presenting an episode of a television series that was selected from the playlist, then the application at pad device 116A can present a companion mode window that provides content that supplements the viewing experience for this content. The companion content can include, for example, an Internet database listing for the series, a link to a Wikipedia™ entry for the series star, a short video about a new series on the same network, or a current article on discussing a real-world person, who performs the same job as the title character. In one or more embodiments, the companion mode can include its own set of controls for remotely controlling the presentation of the media content at the second device (e.g., play, pause, etc.). The companion mode can include the playlist (or an abbreviated version of the playlist). Both devices can include controls for swapping the presentation between the second device and the first device.

Figure 2:
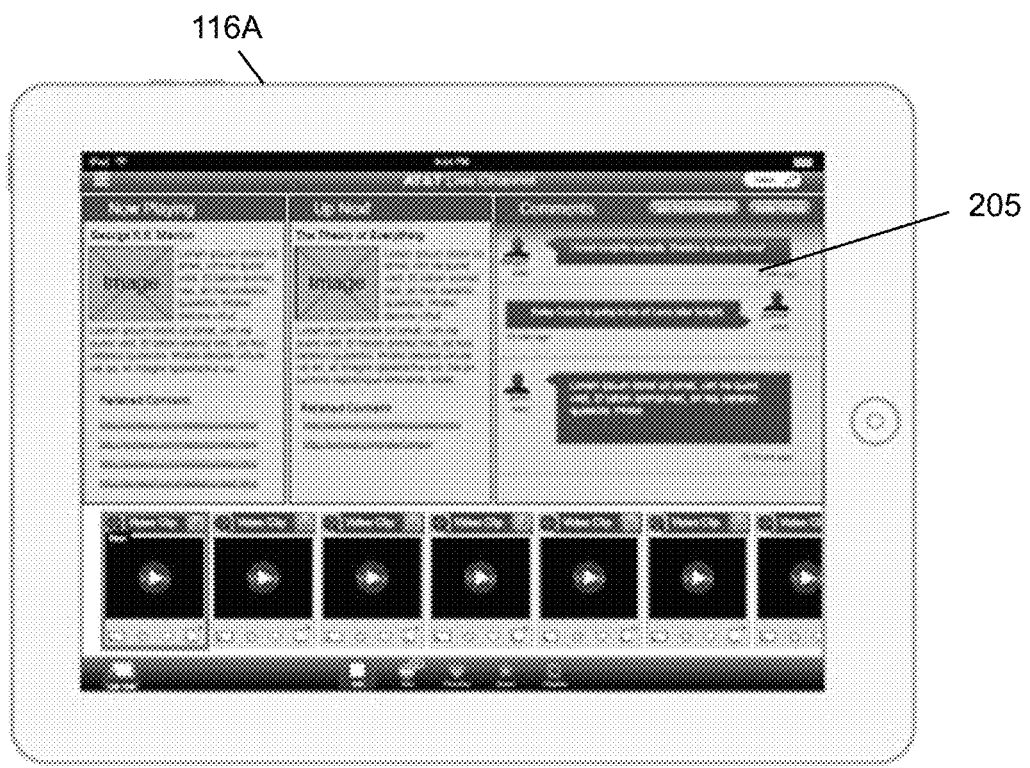
FIGS. 2-7 depict an illustrative embodiments of subsystems for performing flexible consumption of media content via the system described in FIG. 1.
Figure 2:

FIGS. 2-7 depict an illustrative embodiments of subsystems for performing flexible consumption of media content via the system 100 described in FIG. 1. Referring particularly to FIG. 2, a subsystem 200 of the system 100 of FIG. 1 shows a pad device 116A and a media device (or television) 108. In one example, a playlist 205 can be loaded into the application running at the pad device 116A. A user of the pad device 116A can allow the application to auto play the first item of media content from playlist. In this case the item is a trailer video for a new season of a popular premium cable television series. As the trailer plays, the user can decide that she really wants to see this on her television device 210. So, the user casts the trailer video to the media processor 106 for the television device 108, which causes the video to now appear on the television 108, picking up from where it left of at the pad device 116A. At the same time, the application at the pad device 116A switches to the companion mode. The companion mode includes an Internet website with entries for the e-novels that form the basis of the popular television series, an advertisement for an electronic reading device for reading the e-novels, and a social media feed profiling the actors in the series.

Figure 3:
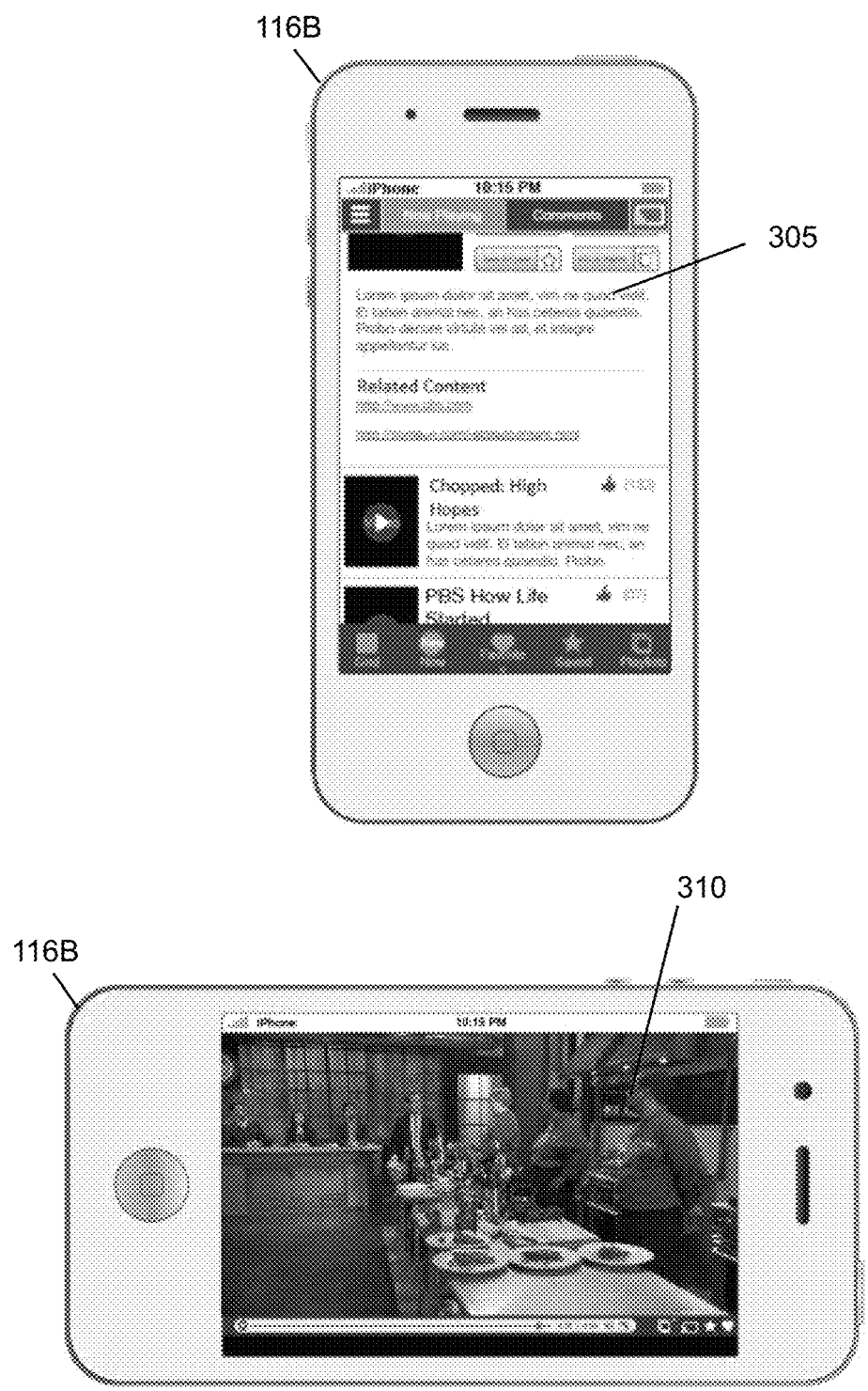

Referring now to FIG. 3, a subsystem 300 of the system 100 of FIG. 1 shows a mobile communication device 116B. In one example, the application is running at the mobile communication device 116B. In this case, the user of the mobile communication device 116B has previously selected a particular television show via his STB 106, which is also running the application. As a result, the application at the mobile communication device 116B enters the companion mode 305. During the television show, an expert chef begins to describe a recipe using certain cut of meat. The user notices that the companion mode on the mobile communication device has added an online video clip of for a different recipe using the same cut of meat. The user can tap on the online video clip at the mobile communication device 116B, and this causes the television to immediately switch from the television show to the online clip. After watching the first ten seconds, the user decides to try to cook the recipe in the online clip and goes to the kitchen. The user taps the mobile communication device 116B, and the online clip 310 can now be shown at the mobile communication device 116B, along with a widget listing the ingredients and a banner ad for a local market.

Figure 4:
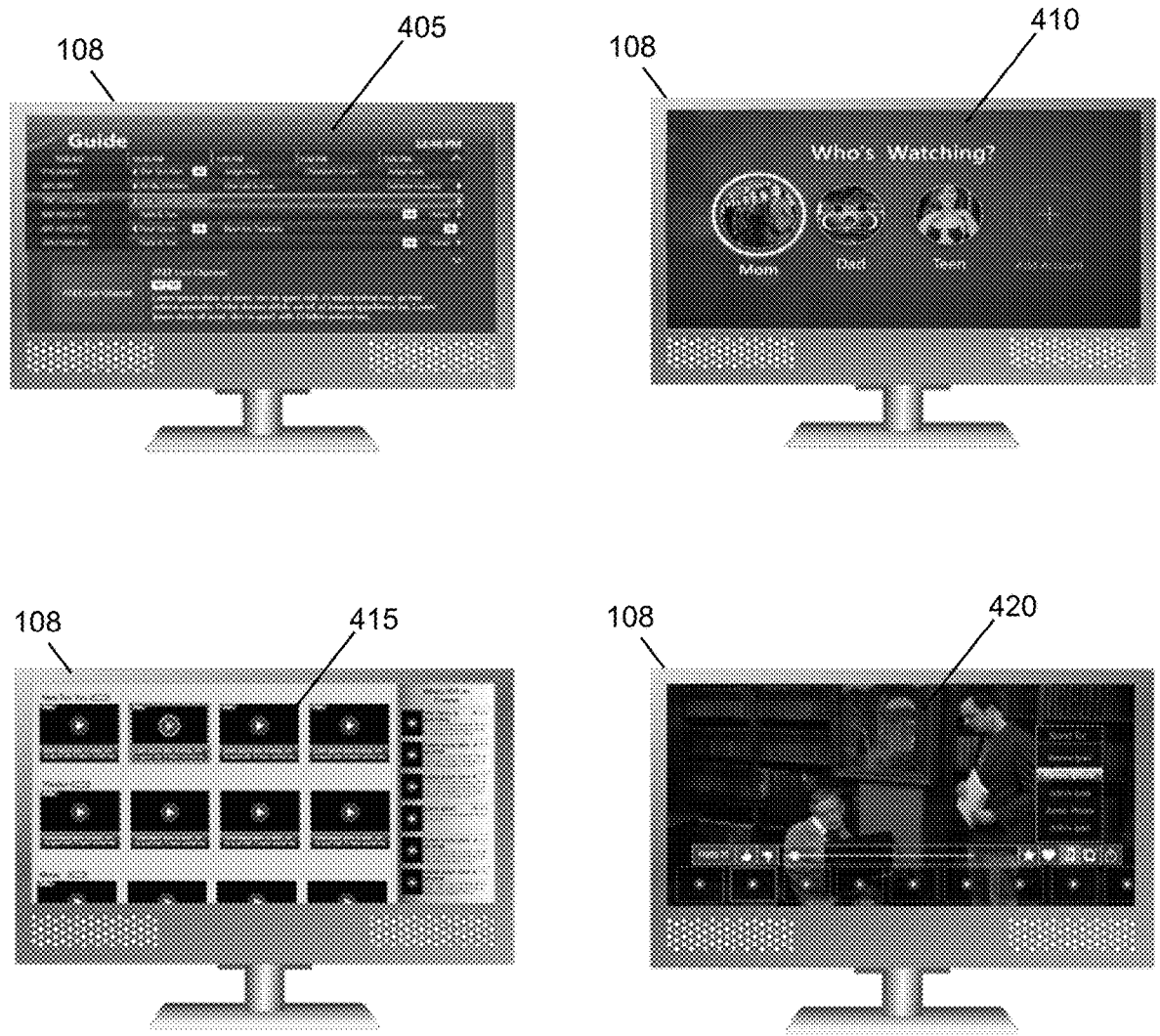

Referring now to FIG. 4, a subsystem 400 of the system 100 of FIG. 1 shows a media device (television) 108 that is connected to a media processor device (STB) 106. In one example, a user turns on the television 108, which presents an electronic programming guide (EPG) 405. One of the available selections at the EPG 405 is a personalized television channel that is generated by the application running at the STB 106. The user can select the personal television channel and this can generate an entry 410 for identifying the user. For example, the television device 108 can be operating at a house with several different users, including young children. By identifying the current user, the application can select the proper playlist that corresponds to this user, while keeping potentially inappropriate content, which might be included this playlist, from the eyes of young viewers. The application can request identifying information, such as a passcode from the user, who interfaces with the application using, for example, a remote control device 107. Once the user has been properly identified, the application can display the user's current playlist 415. The user can select an item from the playlist or let the application auto play. The application transitions to the presentation display 420 which include playback controls as well as a menu for casting the content to other devices.

Figure 5:
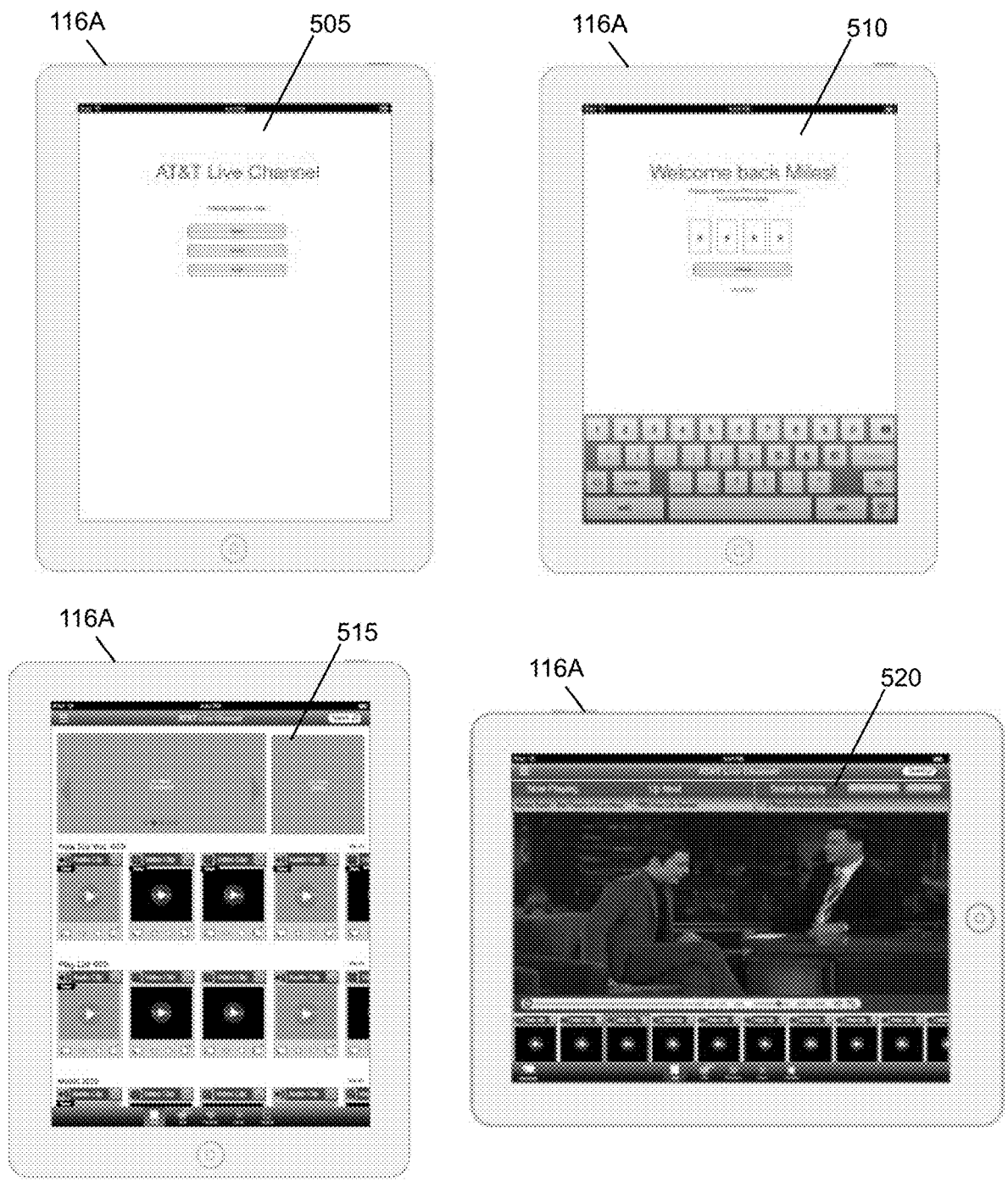

Referring now to FIG. 5, a subsystem 500 of the system 100 of FIG. 1 shows a pad device 116A that is executing the application. The application can initiate a screen 505 that requests the identity of the user and then can transition to a code entry/verification screen 510. Once the user is verified, the playlist 510 can appear. If a selection is made and initiated, the application can switch to the presentation screen 520.

Figure 6:
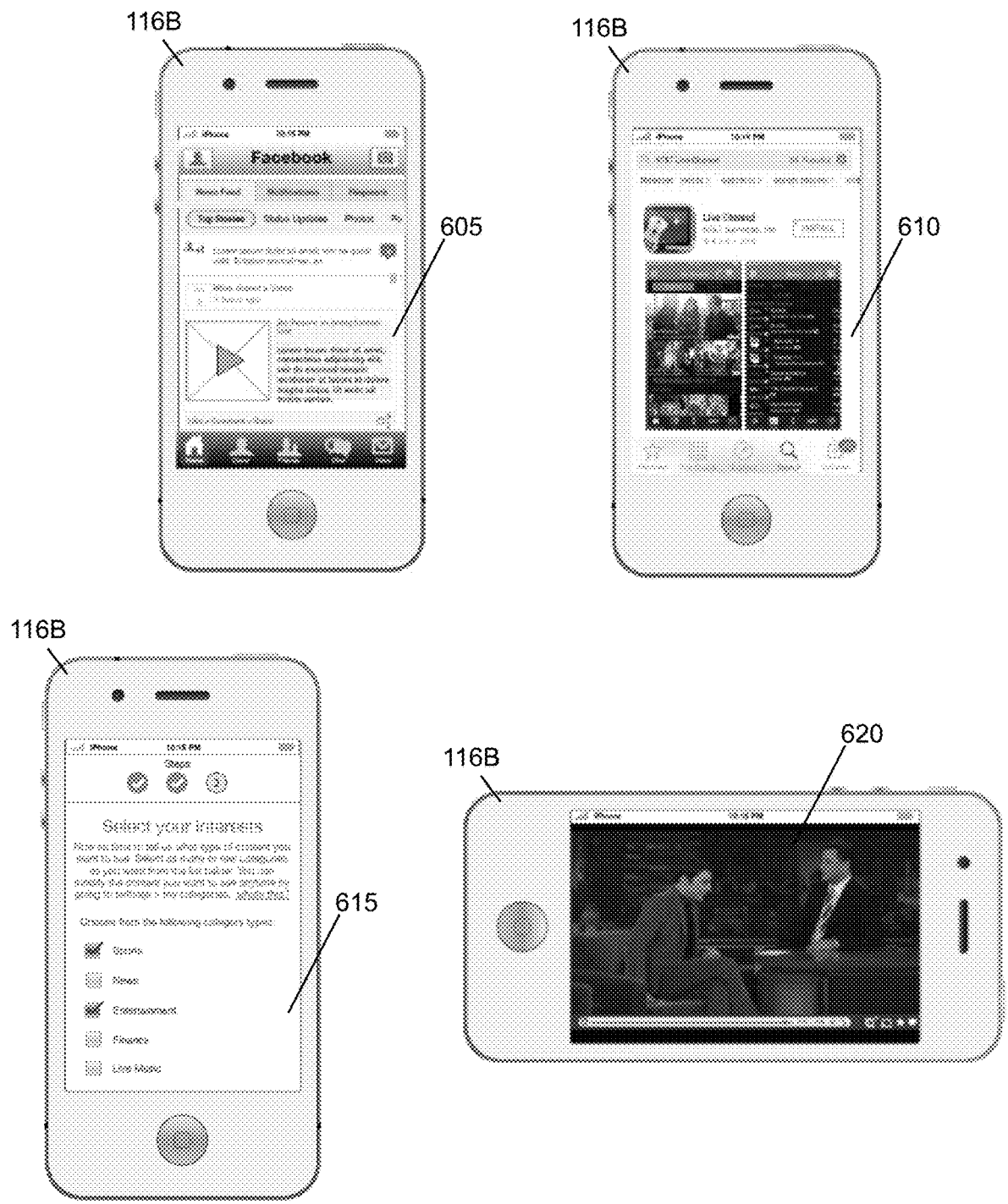

Referring now to FIG. 6, a subsystem 600 of the system 100 of FIG. 1 shows a mobile communication device 116B. In this case, the user can enter a social media application. At the social media site has suggest in a posting 605 that the user check out a media content item. The user can open the item 610. A quick link at the item can be selected by the user, where the link will trigger the application 615. The application can then automatically add the media content item to the playlist and being presentation 620.

Figure 7:
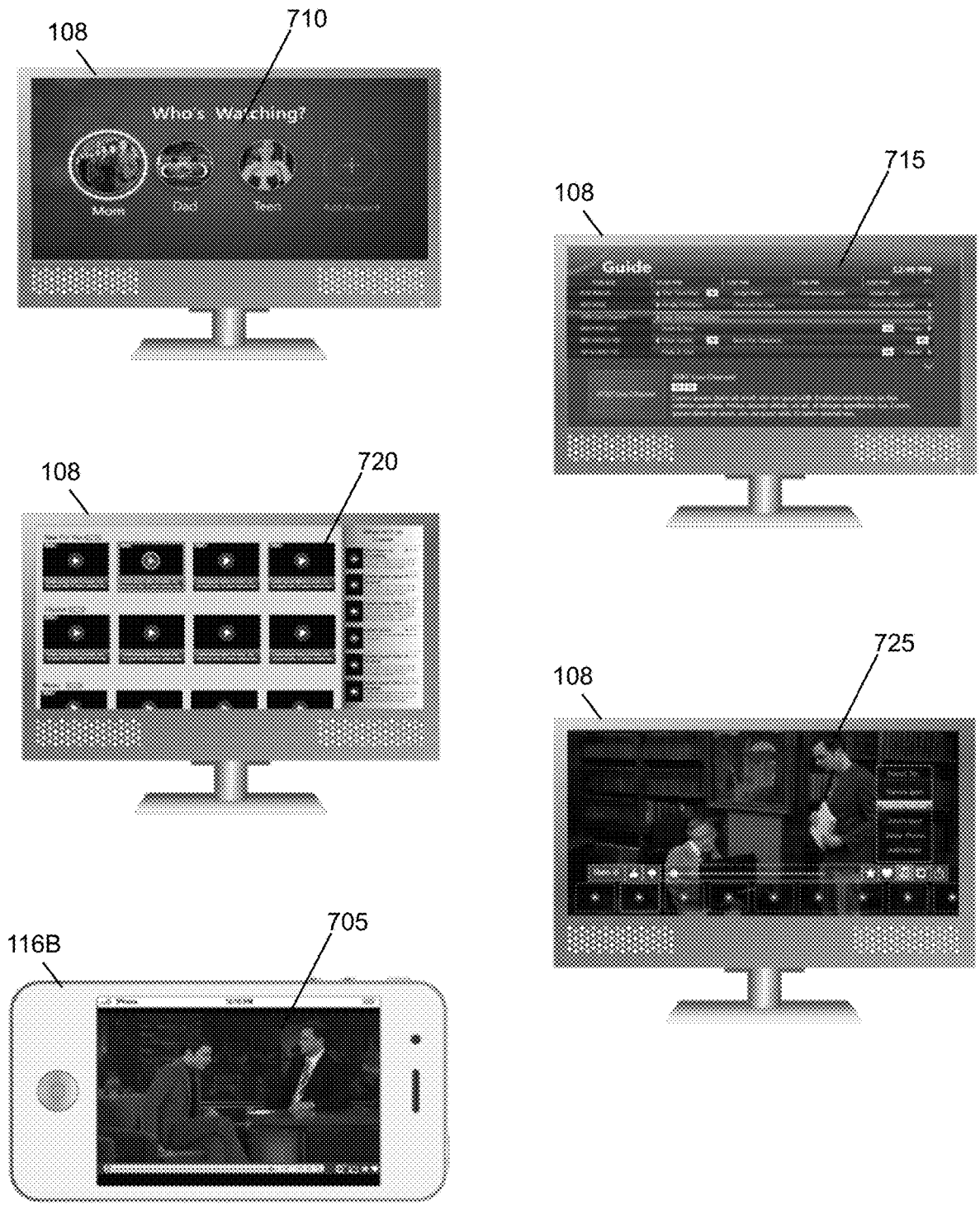

Referring now to FIG. 7, a subsystem 700 of the system 100 of FIG. 1 shows a mobile communication device 116B and a media device (television) 108. In this example, the user moves can traverse the process of identification 710, selecting the personal television channel 715, selecting a media content item from the playlist 720, and presenting this item 725 at that television 108. However, the user can decide to cast the media content item to the mobile communication device 116B, where it is presented from where it left off at the television 108.

Figure 8:
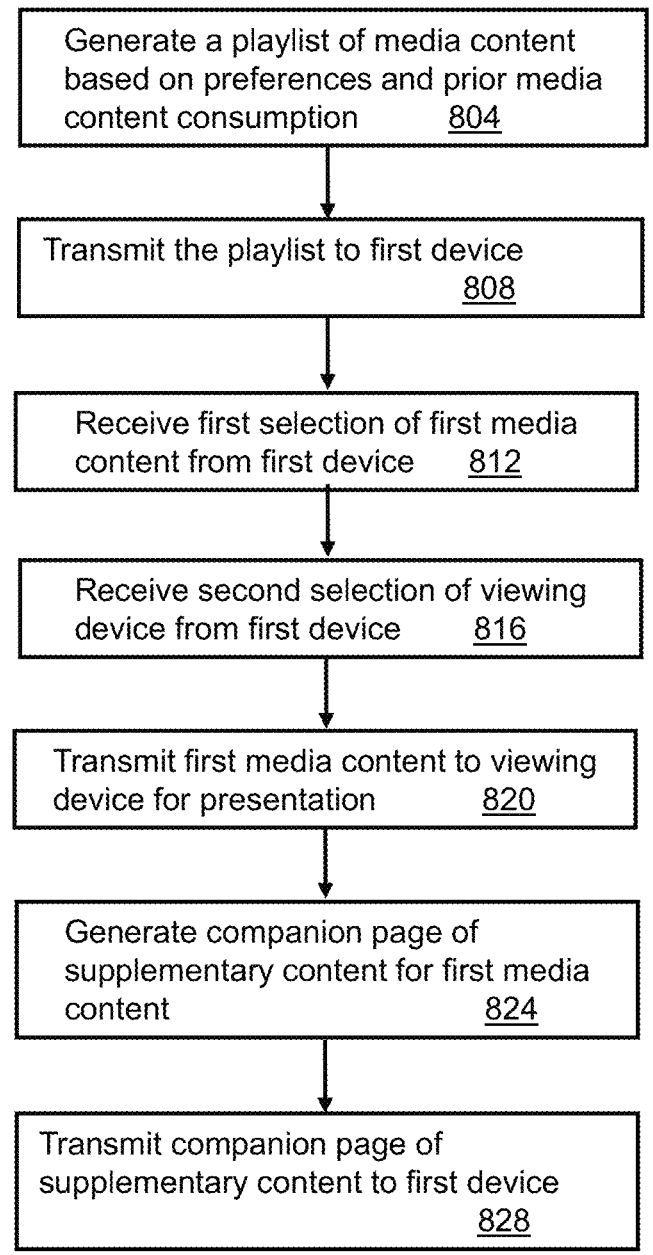
FIG. 8 depicts an illustrative embodiment of a method used in portions of the system described in FIG. 1 and the subsystems of FIGS. 2-7.

FIG. 8 depicts an illustrative embodiment of a method used in portions of the system described in FIG. 1 and the subsystems of FIGS. 2-7. In one or more embodiments, the method provides for flexible presentation of media content at multiple user devices. In step 804, a media server can generate a playlist of media content based on preferences and prior media consumption of a user of a first device. The preference and consumption information can be gathered from prior usage of a media streaming application at the first device and/or at other devices belonging to the user. The preference and consumption information can further be gathered from subscription-based content, social media interactions, and Internet access of the user at the first device and other devices. In one or more embodiments, a portion of the preference information can be supplied by the user or subscriber as overt personalization preferences. For example, a user can be ask to fill out an on-line questionnaire, which allows the user to select between a number of options regarding content likes/dislikes, preferred ordering of content, priorities among content types (e.g., subscription content over free content or newly released content over content that has been out for some time). In one or more embodiments, a portion of the preference information can be collected by parsing social media preferences as well as content that is generated, received, and/or viewed by the user. For example, the user may have declared content preferences in a Facebook™ profile, indicated a "like" of content in a post, or "re-tweeted" a posting on a Twitter™ account, where these actions can be indicators of media content preferences. In one or more embodiments, preference information for a user can be collected from third party sources that collect and sort Internet-based activities. Any interaction of the user with a network with any device can be subject to data collection, tracking, and cataloging, presuming that the user has given overt or implied consent within the context of the activity. These interactions can add to the overall understanding of a user's preferences, in some cases providing early insights into new interests for the user that can be captured and included in the playlist. The playlist is transmitted from the media server to the first device in step 808. The transmission of the playlist can occur after initiation of the application at the first device and/or after authentication of the identity of the user of the first device. The playlist can be update at periodic intervals to reflect media content that has been consumed by the user, content that the user has ignored or rejected, new content that has become available since the last playlist was generated, and/or the addition of content to the playlist by user interactions with other applications.

In step 812, the media server can receive a selection of first media content from the first device. The first media content may have been actively selected by the user by, for example, selecting a control on a user interface that depicts the playlist. The first media content may have been auto selected by the application, if the application is set to operate in auto play mode. In step 816, the media server can receive a second selection from the first device. The second selection can indicate which device will be used for viewing the first media content item. The second selection can be omitted or can default to the first device in auto play mode or if the user does not select any device for viewing. The user can select the viewing device from a menu of choices that reflect devices, associated with the user, that are capable of presenting the content.

In step 820, the media server can transmit the first media content to the viewing device for presentation. The media content can be transmitted by any of several communication paths that are available in the system. One of those paths can involve using the first media device as an intermediary recipient. In step 824, the media server can generate a companion page of supplementary content for the first media content. The supplementary content can include additional media content, website, database, and other URL links to content that is related to the first media content. The supplemental content can be continuously update as the user interacts with the companion page. In step 824, the media server can transmit the companion page to the first device. The companion page can include elements for remotely controlling the presentation of the first media content at the viewing device and for swapping the presentation between the first device and the viewing device.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
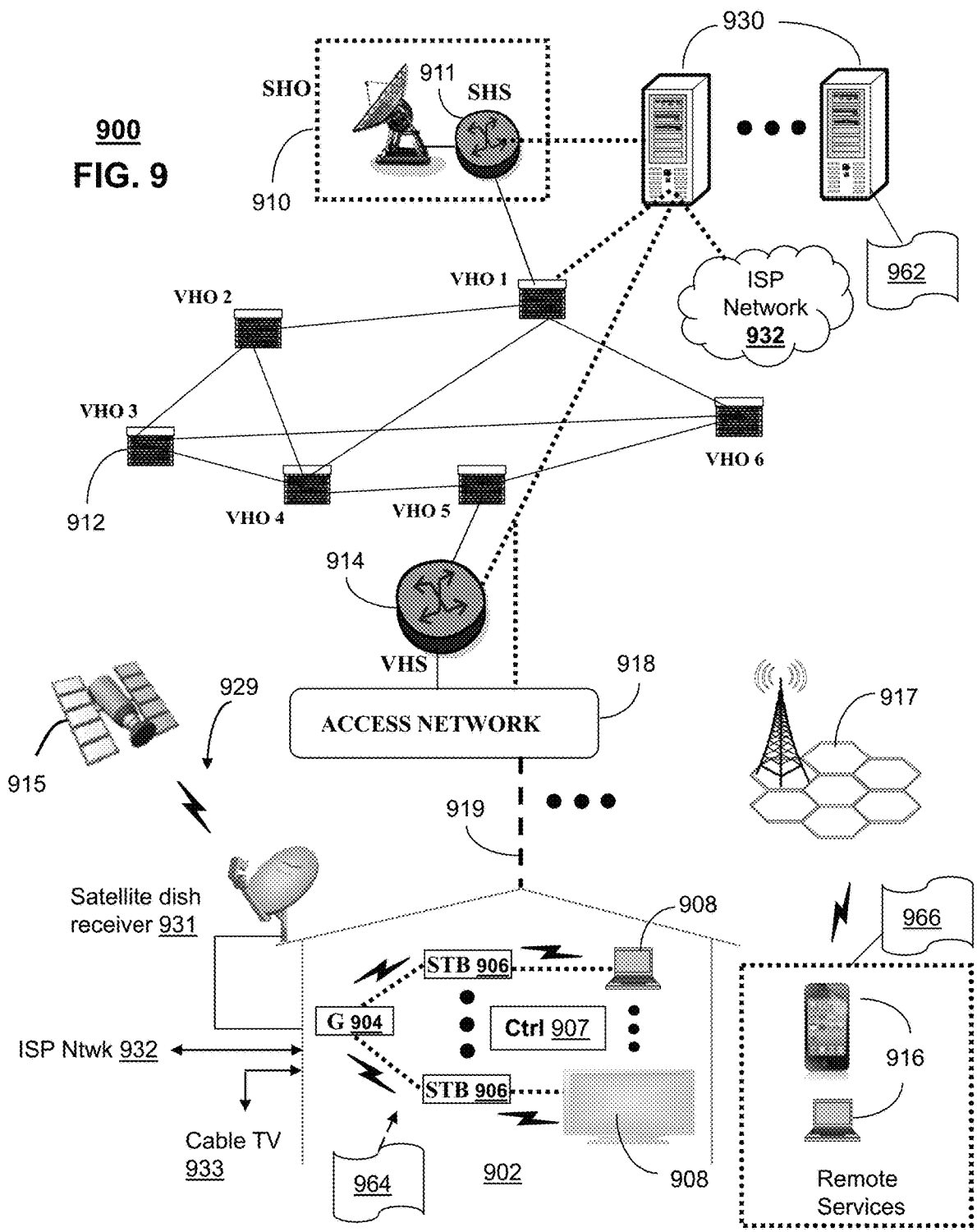
FIGS. 9-10 depict illustrative embodiments of communication systems that provide media services for use by the flexible media consumption system of FIG. 1.

FIG. 9 depicts an illustrative embodiment of a first communication system 900 for delivering media content. The communication system 900 can represent an Internet Protocol Television (IPTV) media system. Communication system 900 can be overlaid or operably coupled with the system 100 of FIGS. 1 and/or 2-7 as another representative embodiment of communication system 900. For instance, one or more devices, such as computing device 930, illustrated in the communication system 900 of FIG. 9, can be used for presenting a playlist of media content generated by a predictive model of preferences of a user of a system based on first prior media consumption associated with a subscription television service and second prior media consumption associated with an internet-based service, receiving a first selection of first media content from the playlist, presenting a menu of viewing devices for viewing the first media content, receiving a second selection of a first companion device for the first media content from the menu of viewing devices, transmitting the first selection and the second selection to a content provider, receiving the first media content from the content provider, and presenting the first media content. The content provider can transmit, to the first companion device, supplementary content, including internet-based content associated with the first media content, for presentation at a display.

The IPTV media system can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 909 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a media server 930. The media server 930 can use computing and communication technology to perform function 962, which can include among other things, provide for flexible presentation of media content at multiple devices as described by method 800 of FIG. 8. For instance, function 962 of server 930 can be similar to the functions described for servers 130 of FIG. 1 in accordance with method 800. The media processors 906 and wireless communication devices 916 can be provisioned with software functions 964 and 966, respectively, to utilize the services of media server 930. For instance, functions 964 and 966 of media processors 906 and wireless communication devices 916 can be similar to the functions described for the communication devices 116A-C of FIG. X in accordance with method 100.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
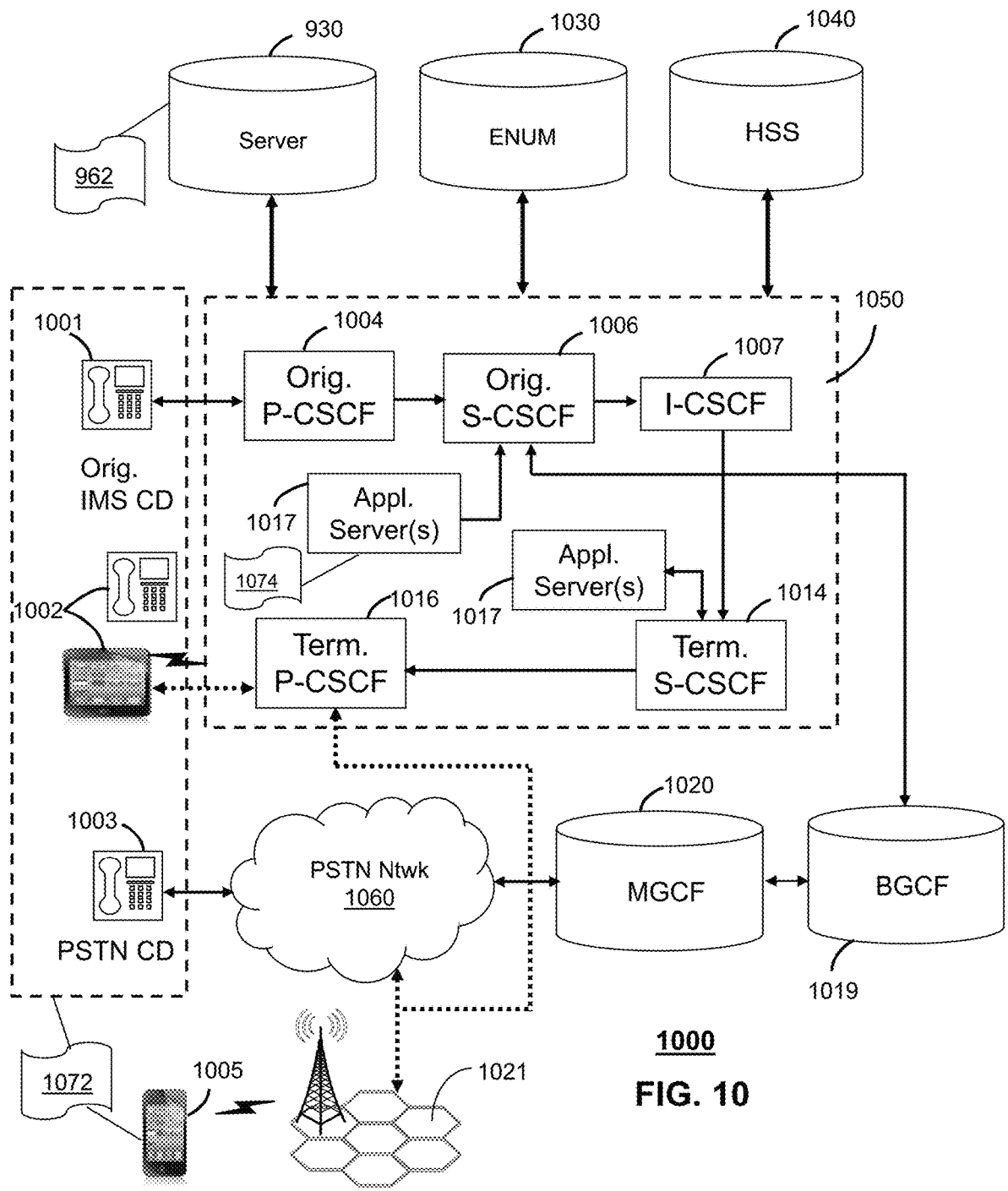

FIG. 10 depicts an illustrative embodiment of a communication system 1000 employing an IP Multimedia Subsystem (IMS) network architecture to facilitate the combined services of circuit-switched and packet-switched systems. Communication system 1000 can be overlaid or operably coupled with system 100 of FIG. 1 and communication system 900 as another representative embodiment of communication system 900. Communication system 1000 can be used for presenting a playlist of media content generated by a predictive model of preferences of a user of a system based on first prior media consumption associated with a subscription television service and second prior media consumption associated with an internet-based service, receiving a first selection of first media content from the playlist, presenting a menu of viewing devices for viewing the first media content, receiving a second selection of a first companion device for the first media content from the menu of viewing devices, transmitting the first selection and the second selection to a content provider, receiving the first media content from the content provider, and presenting the first media content. The content provider can transmit, to the first companion device, supplementary content, including internet-based content associated with the first media content, for presentation at a display.

Communication system 1000 can comprise a Home Subscriber Server (HSS) 1040, a tElephone NUmber Mapping (ENUM) server 1030, and other network elements of an IMS network 1050. The IMS network 1050 can establish communications between IMS-compliant communication devices (CDs) 1001, 1002, Public Switched Telephone Network (PSTN) CDs 1003, 1005, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1030 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 or CD 1005 (in instances where the cellular phone only supports circuit-switched voice communications), the ENUM system 1030 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices. In this embodiment, the cellular base station 1021 may communicate directly with the IMS network 1050 as shown by the arrow connecting the cellular base station 1021 and the P-CSCF 1016.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 930 of FIG. 9 can be operably coupled to communication system 1000 for purposes similar to those described above. Media server 930 can perform function 962 and thereby provide flexible presentation of media content services to the CDs 1001, 1002, 1003 and 1005 of FIG. 10 similar to the functions described for server 100 of FIG. 1 in accordance with method 800 of FIG. 8. CDs 1001, 1002, 1003 and 1005, which can be adapted with software to perform function 1072 to utilize the services of the media server 930 similar to the functions described for communication devices 116A-C of FIG. 1 in accordance with method 800 of FIG. 8. Media server 930 can be an integral part of the application server(s) 1017 performing function 1074, which can be substantially similar to function 964 and adapted to the operations of the IMS network 1050.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 11:
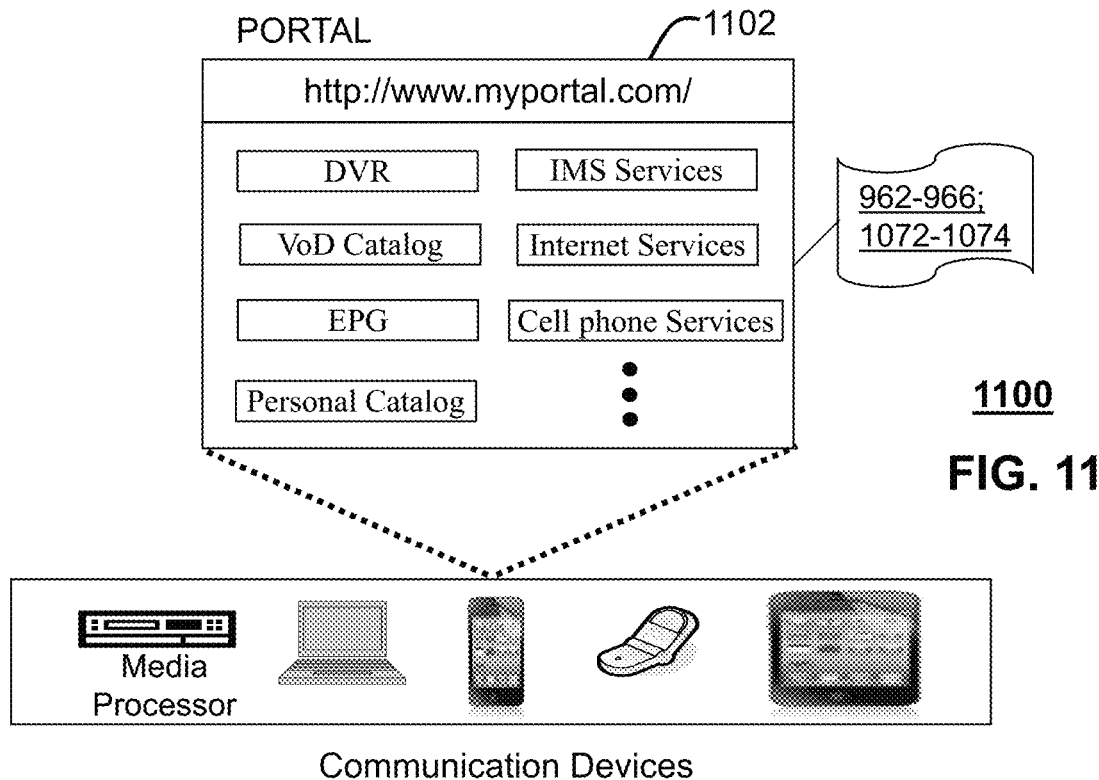
FIG. 11 depicts an illustrative embodiment of a web portal for interacting with the communication systems of FIGS. 1 and 9-10.

FIG. 11 depicts an illustrative embodiment of a web portal 1102 of a communication system 1100. Communication system 1100 can be overlaid or operably coupled with system 100 of FIG. 1, communication system 400, and/or communication system 1000 as another representative embodiment of system 100 of FIG. 1, communication system 900, and/or communication system 1000. The web portal 1102 can be used for managing services of system 100 of FIG. 1 and communication systems 900-1000. A web page of the web portal 1102 can be accessed by a Uniform Resource Locator (URL) with an Internet browser using an Internet-capable communication device such as those described in FIG. 1 and FIGS. 9-10. The web portal 1102 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 1102 can also be used for provisioning IMS services described earlier, provisioning Internet services, provisioning cellular phone services, and so on.

The web portal 1102 can further be utilized to manage and provision software applications 962-966, and 1072-1074 to adapt these applications as may be desired by subscribers and/or service providers of system 100 of FIG. 1, and communication systems 900-1000. For instance, users of the services provided by server 130 or server 930 can log into their on-line accounts and provision the servers 110 or server 930 to program a user profiles or to provide contact information to server to enable it to communication with devices described in FIGS. 1 and 9-10. Service providers can log onto an administrator account to provision, monitor and/or maintain the systems 100 of FIG. 1 or server 130.

Figure 12:
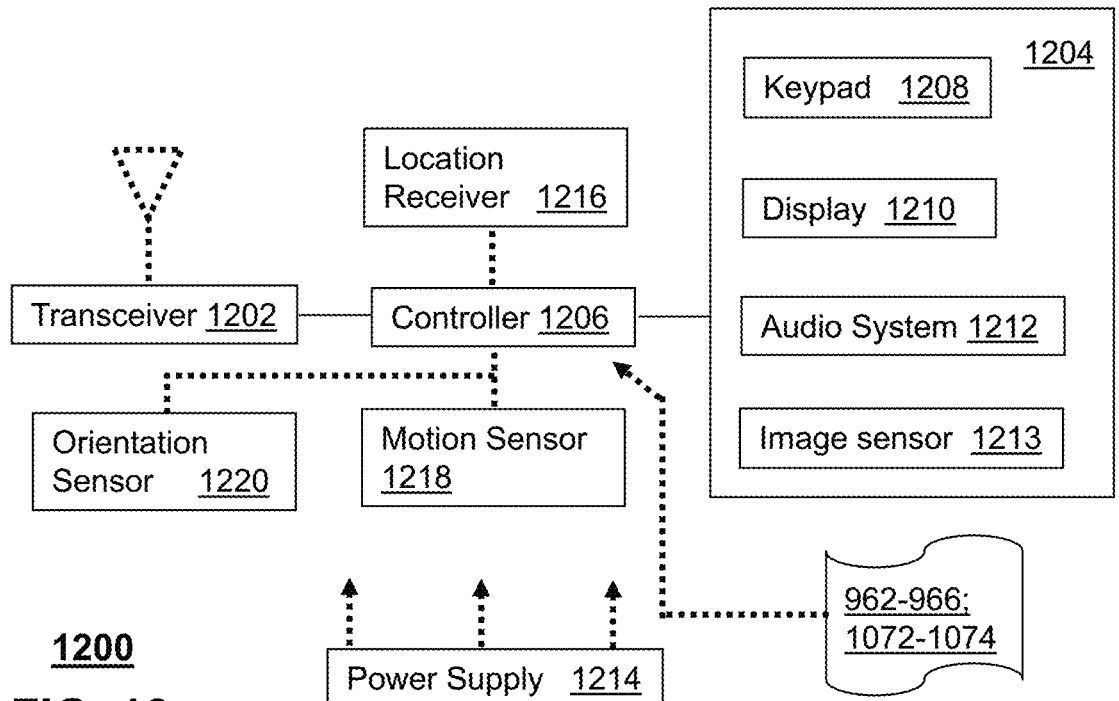
FIG. 12 depicts an illustrative embodiment of a communication device.

FIG. 12 depicts an illustrative embodiment of a communication device 1200. Communication device 1200 can serve in whole or in part as an illustrative embodiment of the devices depicted in FIG. 1, and FIGS. 9-10 and can be configured to perform portions of method 800 of FIG. 8.

Communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of the media server 130, the wireless devices 116A-C, and the media devices 108, of FIG. 1, the media processor 906, the media devices 908, or the portable communication devices 916 of FIG. 9, as well as the IMS CDs 1001-1002 and PSTN CDs 1003-1005 of FIG. 10. It will be appreciated that the communication device 1200 can also represent other devices that can operate in systems of FIG. 1, communication systems 900-1000 of FIGS. 9-10 such as a gaming console and a media player. In addition, the controller 1206 can be adapted in various embodiments to perform the functions 962-966 and 1072-1074, respectively.

Upon reviewing the aforementioned embodiments, it would be evident to an artisan with ordinary skill in the art that said embodiments can be modified, reduced, or enhanced without departing from the scope of the claims described below. For example, while media content is playing at a first device and the companion mode is presented at a second device, a user can enter a search mode at the second device. Search terms can be entered and the companion mode can find new supplemental content as directed by the user. In one embodiment, the media server can generate a series of suggested search terms for seeding the user's search.

In one or more embodiments, the companion application can be presented at the media device (television) 108, while the selected media content from the play list is presented at another device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
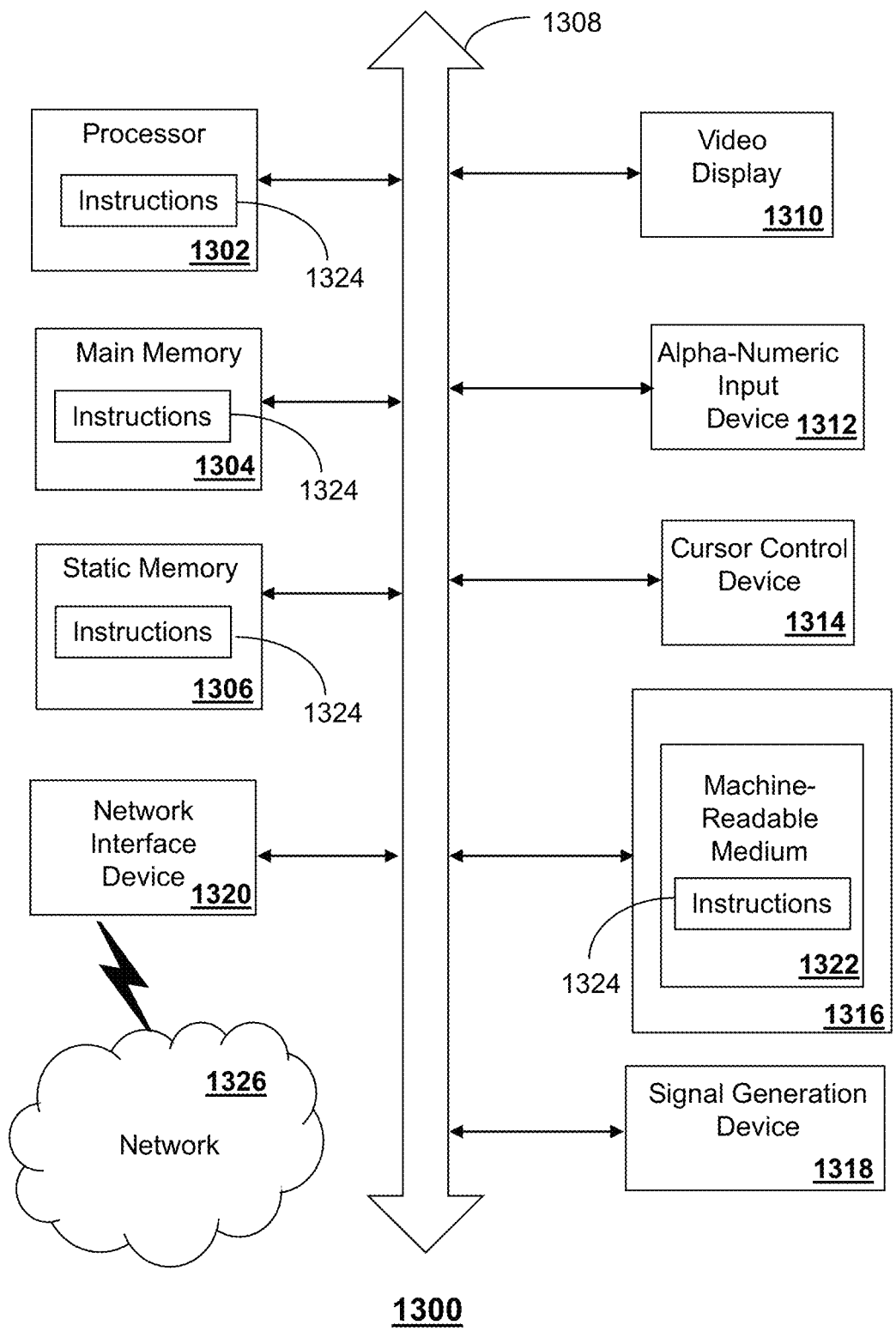
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. One or more instances of the machine can operate, for example, as the media server 930, the media processor 906, the wireless communication devices 916, and other devices of FIG. 9. In some embodiments, the machine may be connected (e.g., using a network 1326) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU)), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory to store executable instructions; and
   a processing system including a processor communicatively coupled to the memory, wherein the processor, responsive to executing the executable instructions, performs operations, the operations comprising:
      selecting a first communication path to provide a first media content to a first viewing device according to a first communication factor, wherein the first media content has associated therewith supplementary media content, wherein the supplementary media content supplements a viewing experience for the first media content, wherein the supplementary media content is obtained in response to receiving a first selection of the first media content from a playlist of media content, wherein the selecting the first communication path is in response to receiving a second selection of the first viewing device from a menu of a group of available viewing devices, and wherein the first communication factor includes a first available bandwidth of the first communication path;
      selecting a second communication path among a plurality of communication paths to provide the supplementary media content to the first viewing device in response to receiving the second selection of the first viewing device, wherein the second communication path is selected according to a second communication factor, wherein the second communication factor includes an available bandwidth of the second communication path, an availability of the second communication path, and a subscription status of an account for a user, wherein the subscription status is determinative of subscription rights for presentation of media content on particular devices, wherein the first communication factor is different from the second communication factor, and wherein the second communication path is different from the first communication path; and
      forwarding the supplementary media content to the first viewing device via the second communication path.

2. The device of claim 1, wherein the playlist of media content comprises media content from a first service providing subscription-based media content and from a second service providing non-subscription-based media content.

3. The device of claim 1, wherein the operations further comprise:
   determining an availability of a plurality of viewing devices for receiving the first media content resulting in the group of available viewing devices; and
   presenting the menu of the group of available viewing devices in response to receiving the first selection of the first media content.

4. The device of claim 1, wherein the operations further comprise streaming the first media content to the first viewing device over the first communication path for presentation on the first viewing device.

5. The device of claim 1, wherein the operations further comprise swapping presentation of the first media content on the first viewing device with the supplementary media content.

6. The device of claim 1, wherein the first viewing device comprises a mobile communication device.

7. The device of claim 1, wherein the playlist of media content is generated based on preferences of the user of the device, a first prior media consumption that is associated with a subscription television service, and a second prior media consumption that is associated with an internet-based service.

8. The device of claim 1, wherein the playlist of media content excludes content not compatible with a plurality of viewing devices for viewing media content.

9. The device of claim 1, wherein the first communication factor includes another availability of the first communication path among another plurality of communication paths and the subscription status of the account for the user.

10. A non-transitory machine-readable storage medium comprising executable instructions that, when executed by a processing system including a processor, facilitate performance of operations, the operations comprising:
   determining an availability of a plurality of viewing devices for receiving a first media content, wherein the determining results in a group of available viewing devices, wherein the first media content has associated therewith supplementary media content, and wherein the supplementary media content supplements a viewing experience for the first media content;
   presenting a menu of the group of available viewing devices in response to receiving a first selection of the first media content from a playlist of media content;

selecting a first communication path to provide the first media content to a first viewing device according to a first communication factor in response to receiving a second selection of the first viewing device from the menu of the group of available viewing devices, wherein the first communication factor includes a first available bandwidth of the first communication path;

selecting a second communication path among a plurality of communication paths to provide the supplementary media content to the first viewing device in response to receiving the second selection of the first viewing device, wherein the second communication path is selected according to a second communication factor, wherein the second communication factor includes an available bandwidth of the second communication path, a second an availability of the second communication path, and a subscription status of an account for a user of the first viewing device, wherein the subscription status is determinative of subscription rights for presentation of media content on particular devices, wherein the first communication factor is different from the second communication factor, and wherein the second communication path is different from the first communication path; and forwarding the supplementary media content to the first viewing device via the second communication path.

11. The non-transitory machine-readable storage medium of claim 10, wherein the playlist of media content comprises media content from a first service providing subscription-based media content and from a second service providing non-subscription-based media content.

12. The non-transitory machine-readable storage medium of claim 10, wherein the operations further comprise streaming the first media content to the first viewing device over the first communication path for presentation on the first viewing device.

13. The non-transitory machine-readable storage medium of claim 10, wherein the playlist of media content is generated based on preferences of the user, a first prior media consumption that is associated with a subscription television service, and a second prior media consumption that is associated with an internet-based service.

14. The non-transitory machine-readable storage medium of claim 10, wherein the operations further comprise swapping presentation of the first media content on the first viewing device with the supplementary media content.

15. The non-transitory machine-readable storage medium of claim 10, wherein the first viewing device comprises a mobile communication device.

16. A method, comprising:
selecting, by a processing system including a processor, a first communication path to provide a first media content to a first viewing device according to a first communication factor in response to receiving, by the processing system, a first selection of the first viewing device from a menu of a group of available viewing devices, wherein the first communication factor includes a first available bandwidth of the first communication path, wherein the first media content has associated therewith supplementary media content, and wherein the supplementary media content supplements a viewing experience for the first media content;

selecting, by the processing system, a second communication path among a plurality of communication paths to provide the supplementary media content to the first viewing device in response to receiving, by the processing system, the first selection of the first viewing device, wherein the second communication path is selected according to a second communication factor, wherein the second communication factor includes a second available bandwidth of the second communication path, an availability of the second communication path, and a subscription status of an account for a user, wherein the subscription status is determinative of subscription rights for presentation of media content on particular devices, wherein the first communication factor is different from the second communication factor, and wherein the second communication path is different from the first communication path;

streaming the first media content to the first viewing device over the first communication path for presentation on the first viewing device; and providing the supplementary media content to the first viewing device over the second communication path.

17. The method of claim 16, wherein a playlist of media content comprises media content from a first service providing subscription-based media content and from a second service providing non-subscription-based media content.

18. The method of claim 16, wherein the first communication factor includes another availability of the first communication path among another plurality of communication paths and the subscription status of the account for the user.

19. The method of claim 16, further comprising swapping presentation of the first media content on the first viewing device with the supplementary media content.

20. The method of claim 16, wherein the first viewing device comprises a mobile communication device.

* * * * *